Sept. 15, 1931.  A. O. AUSTIN  1,823,674
POTHEAD FOR INSULATED CABLE TERMINALS
Filed Jan. 16, 1925
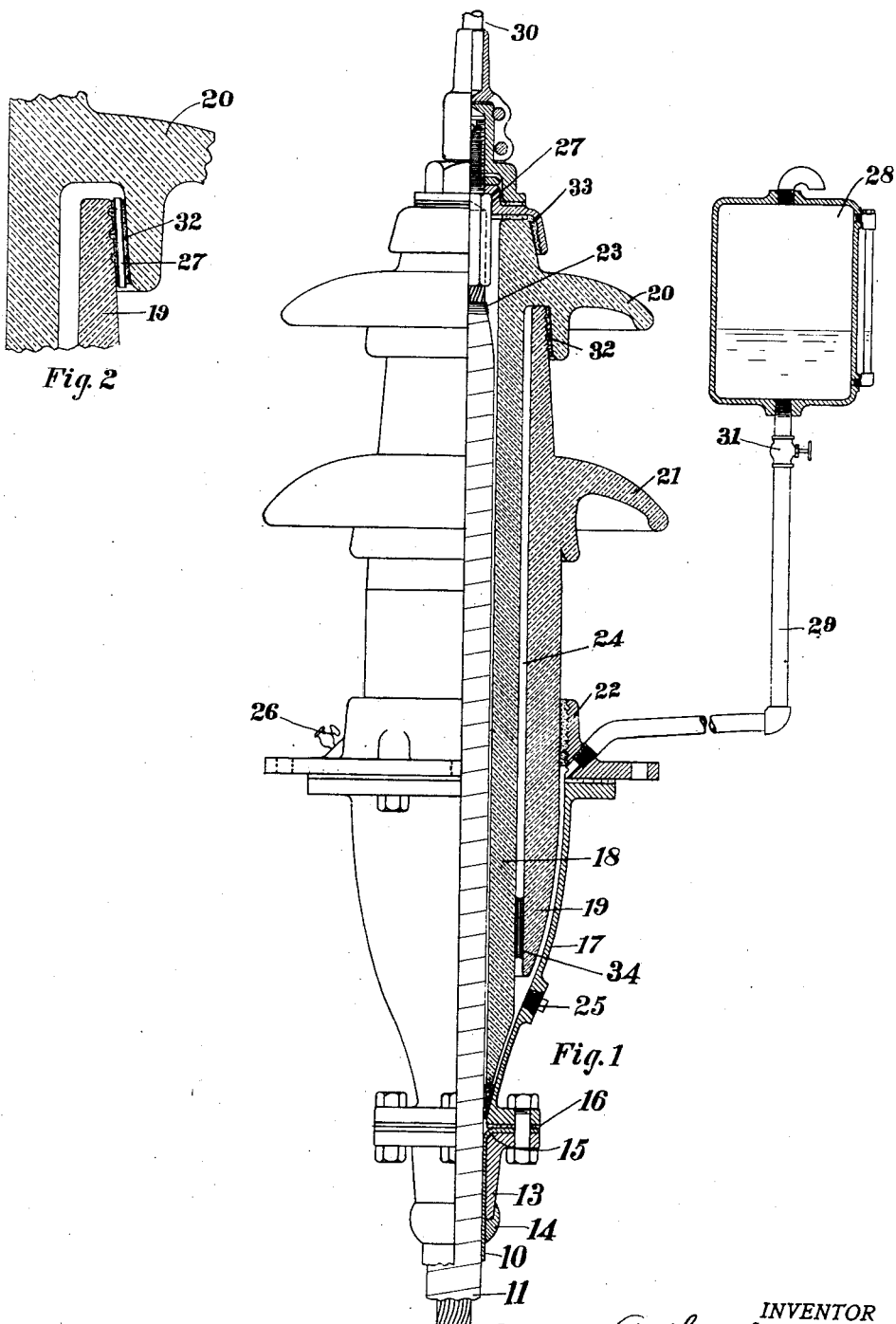

Patented Sept. 15, 1931

1,823,674

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

POTHEAD FOR INSULATED CABLE TERMINALS

Application filed January 16, 1925. Serial No. 2,753.

This invention relates to a device for receiving the end of an insulated conductor having a metallic outer sheath and has for its object the provision of a construction of the class named which shall protect the insulation of the conductor and prevent electrical discharge while facilitating the connection of said conductor with bus bars or air insulated transmission lines.

The invention is exemplified in the combination and arrangement of parts shown in the accompanying drawings and described in the following specification and it is more particularly pointed out in the appended claims.

In the drawings—

Figure 1 is an elevation of one embodiment of the invention with parts in section.

Figure 2 is a fragmentary section on a larger scale showing a detail.

The conductors of insulated cables are usually terminated at a bus bar or on a high tension line. The invention deals with improved terminals which permit the transition from an insulated cable having a grounded metal sheath to a conductor which is usually air insulated. In the ordinary cable construction it is common practice to cover the conducting member with a layer or layers of insulation which is generally made up of a narrow strip of paper wound upon the cable and impregnated with oil or compound. In order to protect the paper from moisture and prevent the compound from flowing out as well as control the dielectric field, the layer of insulation is covered by a metal sheath which is usually lead. As the lead sheath is at ground potential while the conductor carries the full voltage of the cable, it is evident that insulation must be provided at the termination of the cable between these two parts, in order to provide sufficient arcing distance or leakage surface since the dielectric strength of the cable insulation is many times that of the air path equivalent in length to the thickness of the insulation. If the lead sheath is removed to expose a considerable portion of the layer of insulation, it will be found that the flash-over voltage is rather low owing to the charging current which will flow up over the cable starting from the lead sheath. It is also evident that this construction is not plausible as the exposed insulation would readily be carbonized by the discharge and, in the case of paper insulated cables the paper would be subjected to the action of the air so that it would take up moisture and, in addition, the impregnating compound would be allowed to flow away. It will also be found that where the lead sheath terminates there will be a bunching of dielectric flux which limits the voltage that can be placed on the cable.

In the improved construction shown in this invention, potheads may be built for very high voltages as well as low voltages so that the maximum voltage carrying capacity of the cable may be developed or utilized and the insulation readily and safely made.

In the invention shown a cable having a lead sheath 10 provided with a layer of insulation 11 and a conductor 12 is inserted in a clamping flange or sleeve 13. The lead sheath 10 may be attached to the flange by a joint 14 or by carrying the lead sheath up through the sleeve 13 and flaring at 15. When this latter method is used a gasket 16 is placed between the flared sheath 15 and the lower face of the bell 17. The clamping sleeve 13 may be made in a single piece or may be made in two halves, the latter construction being advisable where it is desired to clamp the cable very tightly to provide mechanical support. In order to increase the flash-over voltage for a given length of exposed surface, it is desirable to lower the electrical stress of the conducting parts terminating in the air. This requires an increase in diameter of the insulation interposed between the cable and enclosing metallic casing. This is obtained by interposing insulating baffles 18 and 19 having weather sheds 20 and 21 respectively. As these insulating sleeves are interposed between the conducting or terminating bell 17 and the cable insulation 11 they not only increase the diameter of the insulation but take a part of the electrical stress imposed on the cable. As the insulating portion projects above the main flange 22 the insulating baffles carry more of the stress so that the insulation on the cable may be terminated at some point within the tubular member as at 23 without affecting the performance or the carrying voltage of the conductor as the insulation for the cable carries little, if any, electrical stress at this point, it having been transferred to the insulating members 18 and 19 and the insulating zone 24 as well as the insulating medium between the cable insulation and the insulating sleeve. In the form of high voltage pothead it is possible to insure a good electrical joint between the insulation on the cable and the dielectric members, as the construction is such that an insulating compound or oil may be made to fill the space by filling through the hole 25 and venting at 26 and 27. This filling may be done in one of several methods. In some cases a compound or oil which will flow readily may be used with a reservoir 28 connected through a pipe 29 to the inner space of the bell 17. As the bell may be at ground potential it is evident that the control of the head of the compound in the reservoir 28 may be effected at any time providing the reservoir is placed at sufficient distance so the operator will not get too near the high voltage conductor 30. The flow of the compound from reservoir 28 will be regulated by a valve 31. Where the breathing of the cable causes a considerable take up of the filling oil or compound, the construction employed permits of a large reservoir or chamber which if placed at the proper height will automatically supply compound for the cable as it is taken from the pothead. By providing a vent through the joint at 32 and 33 it is possible to fill the space between the insulating members 18 and 19 as well as between the cable insulation and the member 18. It is evident, however, that in this case the level of the compound in the reservoir 28 cannot be above the lowest venting point 32 or 33. In some cases the space between the members 18 and 19 is filled and sealed by joints 32 and 34 in which case the compound in the reservoir may be raised to the highest venting point in the bushing as at 33. By placing the pipe 29 in a level position or at a slight angle upward from the flange, any air trapped between the bell 17 and the insulating baffles 18 and 19 will tend to work its way out.

To facilitate filling in the first place, a small valve or petcock 26 may be opened. It is evident that this construction provides an insulating portion which may be made of considerable size which may be exposed to the weather and at the same time provide contact between the cable insulation and the dielectric members. The method also permits of the use of soft filling compounds or oils which will not only tend to keep the cable impregnated but tend to prevent the formation of voids or vacuum during cold weather due to the contraction of the filling compound or oil. The construction is such that the cable may be insulated without applying heat for the lead sheath joint at the lower end of the pothead so that there is little danger of damaging the insulation during installation.

I claim—

1. A pothead comprising a metallic casing, a tubular dielectric member extending into said casing and projecting beyond the end thereof, said casing and dielectric member being connected to form a housing, a second tubular dielectric member disposed within but spaced from said first named dielectric member and supported on the top thereof and a conductor extending through said metallic casing into said housing.

2. A pothead comprising a lower metallic casing member, a tubular dielectric member extending into said casing member and secured thereto adjacent the top of said casing member but spaced inwardly from said casing member below the point of connection therewith forming an annular opening between said dielectric and casing members closed at its top, said casing member being vented adjacent the top of said annular opening to permit the space between said members to be filled with insulating fluid.

3. A pothead comprising a lower metallic casing member constituting a liquid tight receptacle, a tubular dielectric member, a flange secured to said dielectric member between the ends thereof, and means for connecting said flange to said metallic casing member to permit said dielectric member to extend into said metallic casing member and a second tubular dielectric member supported in but spaced from said first named dielectric member and having an outwardly projecting flange secured to the top of said first named dielectric member to close said first named dielectric member and support said second named dielectric member.

4. In combination a conductor having a covering of dielectric material and an outer metal sheath, a metallic casing member having an opening at its lower end for receiving said conductor, said sheath being terminated adjacent said opening at a position outside of the interior of said casing member, said sheath being electrically and mechanically connected to said metallic casing member there being no break in the continuity between the sheath and the casing and no abrupt ledge or corner in the metal work surrounding the cable until the metal has flared from the cable for a considerable distance, a tubular dielectric member extending into said casing member substantially to the inner end of said opening and surrounding said conductor and dielectric covering, and a flange secured to said dielectric member intermediate the ends thereof and supported on said metallic casing member.

5. A pothead comprising a lower metallic casing member and a tubular dielectric member extending through the upper end of said casing member, a flange secured to said dielectric member intermediate the ends thereof, means for connecting said flange with the upper end of said metallic casing member, said dielectric member and metallic casing member being spaced from one another below said flange, a reservoir for supplying insulating fluid to said pothead, and a conduit from said reservoir extending through said flange and communicating with the upper portion of the opening between said conductor and metallic casing member.

6. A pothead comprising a metallic casing member, a tubular dielectric member extending through the upper end of said metallic casing member, a flange secured to said tubular dielectric member intermediate the ends thereof, means for connecting said flange to the upper end of said metallic casing member, said flange having a vent therethrough communicating with the interior of said metallic casing member, and means for supplying a dielectric fluid to the interior of said metallic casing member.

In testimony whereof I have signed my name to this specification on this 13th day of January, A. D. 1925.

ARTHUR O. AUSTIN.